(12) United States Patent
De La Guardia Gonzalez et al.

(10) Patent No.: US 12,515,337 B2
(45) Date of Patent: Jan. 6, 2026

(54) HIERARCHICAL POLYTOPE WORKSPACE MAPPING FOR HUMAN-ROBOT COLLABORATION

(71) Applicant: Intel Corporation, Santa Clara, CA (US)

(72) Inventors: Rafael De La Guardia Gonzalez, Guadalajara (MX); Leobardo Campos Macias, Guadalajara (MX); David Gonzalez Aguirre, Portland, OR (US); Javier Felip Leon, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 104 days.

(21) Appl. No.: 18/235,675

(22) Filed: Aug. 18, 2023

(65) Prior Publication Data

US 2025/0060729 A1 Feb. 20, 2025

(51) Int. Cl.
*B25J 9/16* (2006.01)
*G05B 19/4155* (2006.01)

(52) U.S. Cl.
CPC ........... *B25J 9/1666* (2013.01); *B25J 9/1676* (2013.01); *B25J 9/1697* (2013.01); *G05B 19/4155* (2013.01); *G05B 2219/40202* (2013.01); *G05B 2219/40468* (2013.01)

(58) Field of Classification Search
CPC ...... B25J 9/1664; B25J 9/1666; B25J 9/1671; B25J 9/1674; B25J 9/1676; B25J 9/1694; B25J 9/1697; G05B 19/4155; G05B 2219/40202; G05B 2219/40203; G05B 2219/39091; G05B 2219/40515; G05B 2219/40523; G05B 2219/40468; G05B 2219/40472; G05B 2219/40475; G05B 2219/40476; G05B 2219/40478; G05B 2219/40479; G05B 2219/40413
See application file for complete search history.

(56) References Cited

U.S. PATENT DOCUMENTS

| | | | |
|---|---|---|---|
| 2019/0344445 A1* | 11/2019 | Song | B25J 9/1697 |
| 2024/0066698 A1* | 2/2024 | Campos Macias | B25J 9/1676 |
| 2024/0424676 A1* | 12/2024 | Bylard | B25J 9/1676 |

OTHER PUBLICATIONS

Barequet et al., "BOXTREE: A Hierarchical Representation for Surfaces in 3D", 1996, Eurographics, vol. 15, No. 3, pp. C-387-C-396 (Year: 1996).*
Lin, Ming C., "Efficient Collision Detection for Animation and Robotics", 1993, University of California at Berkeley, (Year: 1993).*

* cited by examiner

*Primary Examiner* — Spencer D Patton
(74) *Attorney, Agent, or Firm* — Schwegman Lundberg & Woessner, P.A.

(57) ABSTRACT

Various aspects of techniques, systems, and use cases for robot movement within human-robot collaboration (HRC) areas are disclosed. Convex free-space regions around points of interest in the HRC are detected and updated using one or more sensors. Collision-free motion plans for robots use a Hierarchical Convex Polytope (HCP) region in which the robot is removed from the occupied space in the scene using depth cameras.

20 Claims, 12 Drawing Sheets

1100

200A

200B

200C

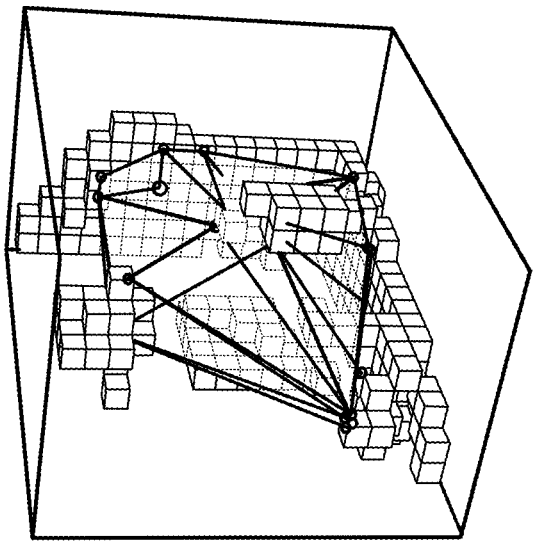
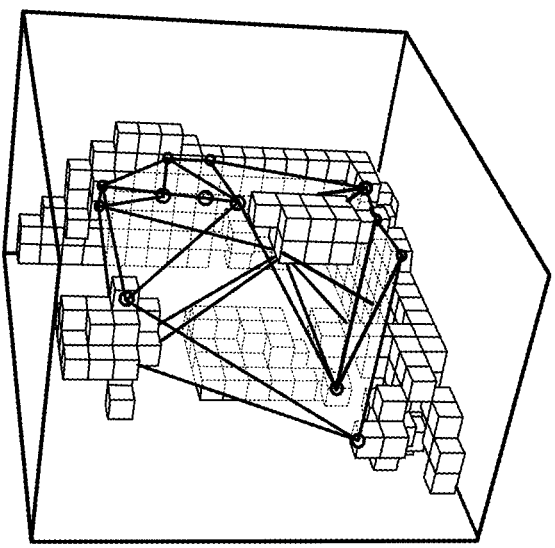
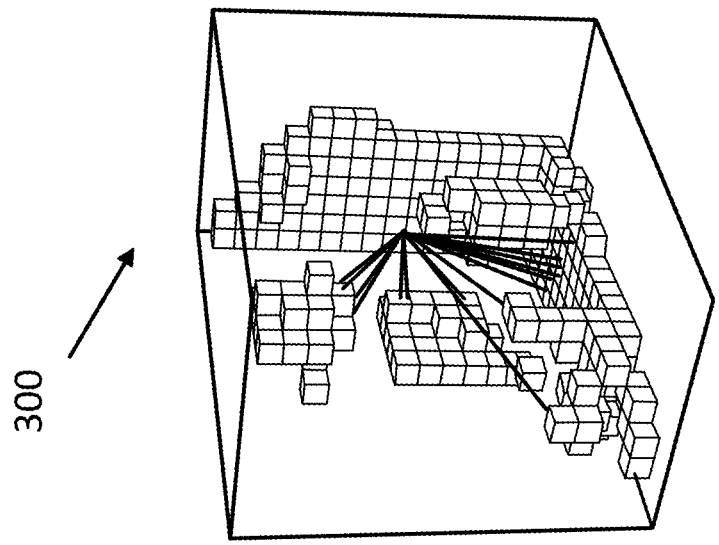
FIG. 3

HIERARCHICAL CONVEX POLYTOPE ALGORITHM

Inputs: query_point, octree, level
Output: *convex_hull* vertex_list ← Select the octree nodes at level=level which are conected to query_point by a collision-free line
*convex_hull* ← Compute the Convex Hull of *vertex_list*
*interior_list* ← Select the vertices from *vertex_list* which are inside *convex_hull*
While *interior_list* is not empty:
   *new_boundary_point* ← Find the Point from *interior_list* which is further from the Boundary of *convex_hull*
   *nearest_polygon* ← Find the Polygonal Face of *convex_hull* nearest to *new_boundary_point*
   *new_polygon* ← Translate *nearest_polygon* towards *new_boundary_point*
   *unchanged_vertex_list* ← Get the Coordinates of *convex_hull* minus the Coordinates of *nearest_polygon*
   *convex_hull* ← Compute the Convex Hull of *unchanged_vertex_list* plus the Coordinates of *new_polygon*
   *interior_list* ← Select the Vertices from *vertex_list* which are inside *convex_hull*

FIG. 5

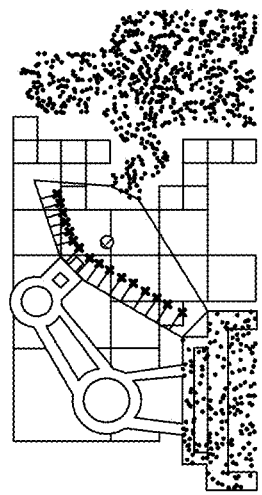
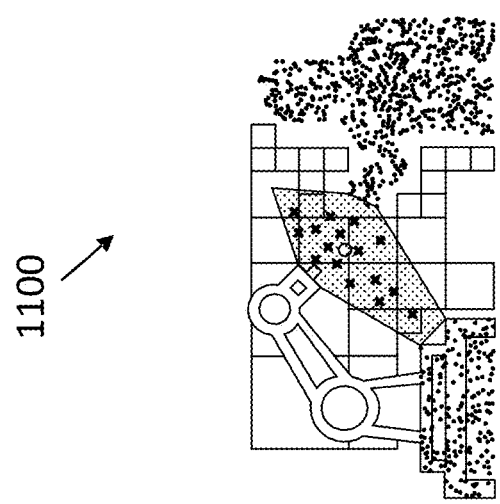
FIG. 11
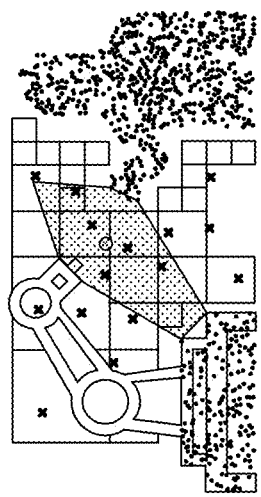

HIERARCHICAL POLYTOPE WORKSPACE MAPPING FOR HUMAN-ROBOT COLLABORATION

BACKGROUND

Robots and other autonomous agents may be programmed to complete complex real-world tasks. Robotics use artificial intelligence (AI) to perform tasks in industrial environments. Robotics span a wide range of applications, such as industrial applications (e.g., smart manufacturing assembly lines, multi-robot automotive component assembly, computer and consumer electronics fabrication, smart retail and warehouse logistics, robotic datacenters, etc.), service, hospitality, and edutainment. Robots create and deliver value by executing heavy, repetitive, and precise physical actions upon the environmental and detached objects.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates construction of a Hierarchical Convex Polytope (HCP), free space region according to an example.

FIG. 5 illustrates an HCP algorithm according to an example.

FIG. 11 illustrates polytope region use according to an example.

DETAILED DESCRIPTION

Systems and techniques described herein provide improved processing of sensor data for safe space identification for Human-Robot Collaboration interactions.

In human-robot collaborative workspaces, continuous visual monitoring allows robots to adapt their plans based on the actions of other agents and to react to unforeseen situations. Collaborative scenarios involving humans and robots are presently limited and mainly involve a robot slowing down or stopping when a human is inside the workspace. However, the availability of reliable low-cost sensors, such as Intel® RealSense™ depth cameras, makes it possible to provide complete coverage of the workspace using multiple sensors at fixed locations and/or mounted on robots (combining the views of the sensors). Algorithmic improvements may be used for real-time processing of the sensor data, identification of a safe space for motion planning, and directing attention to regions where human-robot interactions take place.

Topological mapping combined with vision and range sensors may be used in robotics. In some embodiments, a topological map may be constructed by segmenting the free space of the entire environment into a set of convex regions, which are connected to neighboring regions by portals. To determine closeness to obstacles, a single RGB-D camera may be used together with a depth space approach, evaluating the distances between a few control points selected along the robot arm and any obstacle, including humans. Convex polytopes seeded at a selected point of interest may be generated directly from point clouds. Such convex regions, previously used only for motion planning, may be used for human robot collaboration. Human-robot collaboration may have different performance and attributes beyond geometric and topological assigned to the different regions.

Note that computing overlapping polytopes in the entire workspace and solving optimization problems online is computationally expensive. Computing convex polytopes directly from point clouds, while fast, may not be robust to noise, e.g., from depth cameras, and may be unable to efficiently handle, e.g., topological queries that depend on the scene structure outside the polytope. Methods combining online and numerically stable construction of free space polytopes with human intent prediction and robot planning may be used instead.

Accordingly, a method is disclosed herein to detect and to iteratively update convex free-space regions around points of interest in human-robot collaboration (HRC) scenarios. The method is fast and operates in real time and at multiple spatial scales. Based on the availability of the convex regions, methods are disclosed to speed up intent prediction and hierarchical sampling in HRC use cases. Moreover, a method to generate collision-free motion plans for robots is provided. The method includes removal of the robot (self-segmentation) from the occupied space captured using depth cameras.

Figure 1:
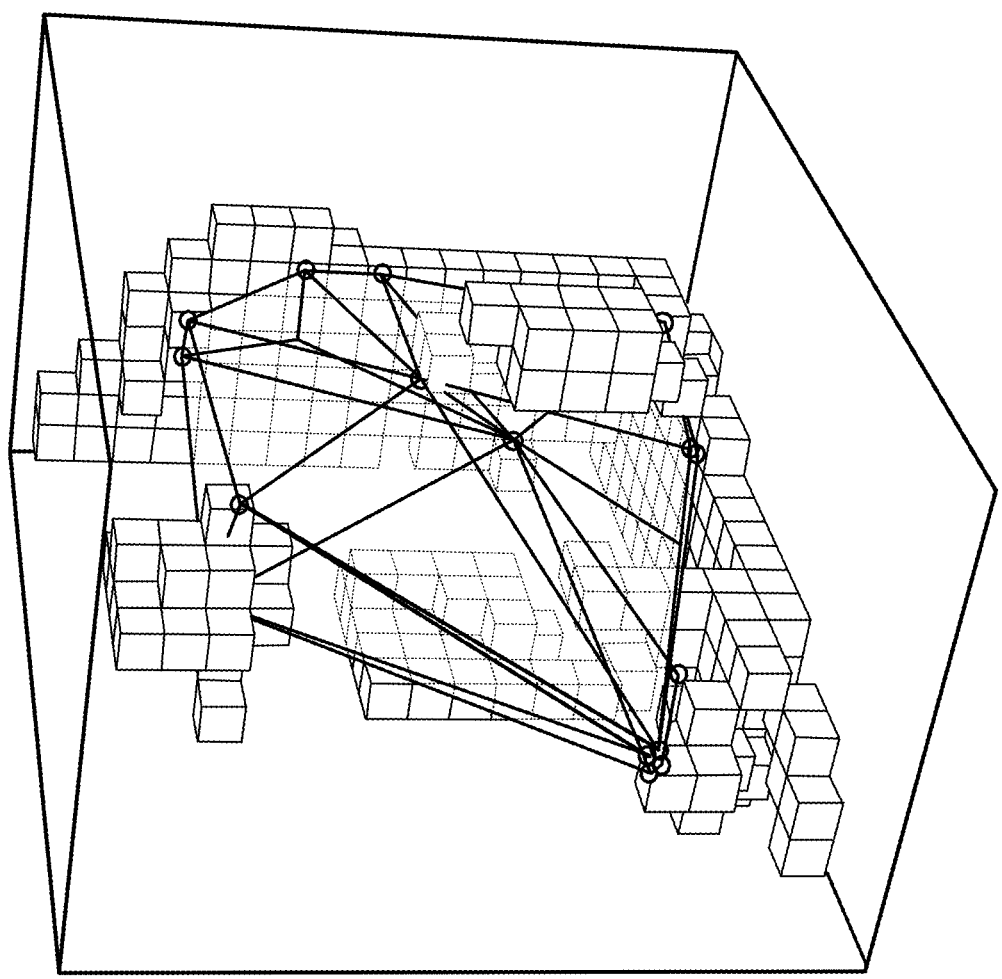
FIG. 1 illustrates a convex region according to an example.

FIG. 1 illustrates a convex region according to an example. The convex region 100 shown in FIG. 1 is constructed using the method described herein. The method ensures that the center of the local frame represented by the arrows is contained inside the region. This local frame may correspond to the end effector of a robot, which is removed from a voxelized representation of the scene. The method takes advantage of the octree structure to quickly generate as large a region as possible that is used for motion planning, human-robot interaction, etc.

It is desirable to identify the free, unoccupied, space around a point of interest using a linear octree structure to anchor the point of interest and enable efficient updates even in dynamic environments. An octree provides a sparse representation of the free space between objects, e.g., between a robot and a human, which can be incrementally built as the environment changes and new sensor data becomes available. Convex polytopes provide an efficient means to compute on-the-fly distances and gradients between any pair of query points and/or find the closest obstacle to a robot or human. A hash function provides constant time access to the map entities involved in the distance computations. The structure of the polytope region may be leveraged to inform human intent prediction and robot motion planning algorithms.

Manipulator Arm Removal

Figure 2A:
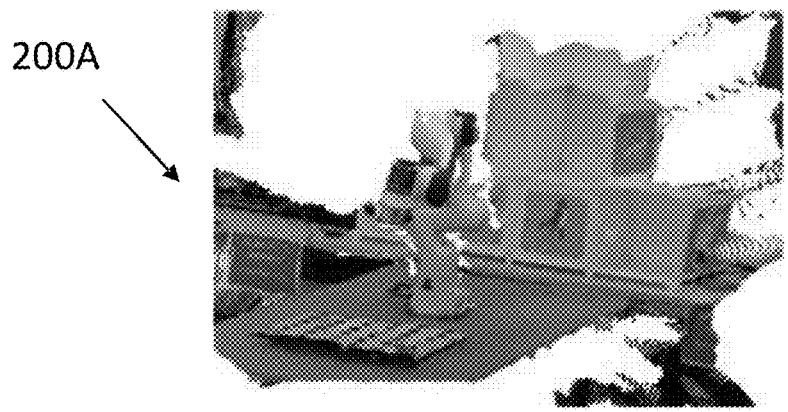
FIG. 2A illustrates a point cloud according to an example.
Figure 2B:
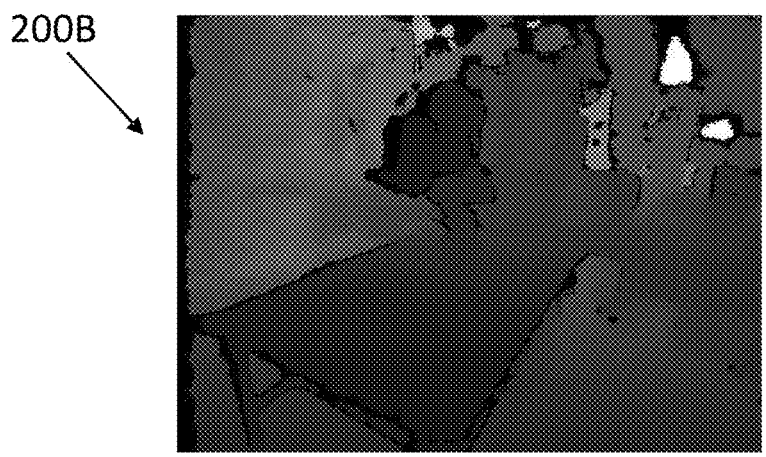
FIG. 2B illustrates a disparity image according to an example.

An initial step may be to remove the robotic (embodiment), usually the arm, from the point cloud since the collision algorithm treats the robot as a separate entity from the octree representation. FIG. 2A illustrates a point cloud according to an example. The point cloud 200A is produced by a robot scenario. FIG. 2B illustrates a disparity image according to an example. The disparity image 200B may be produced from a two-camera sensor, for example.

Figure 2C:
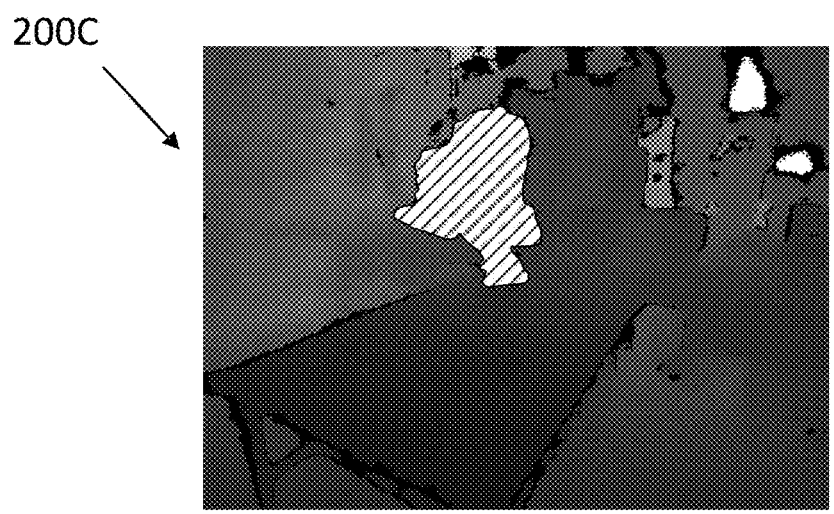
FIG. 2C illustrates a mask according to an example.

The position of the encoders (joint configuration) may be known and used to remove the arm from the point cloud 200A. Other methods use the joint configuration to create capsules enclosing the robot arm, and all the points inside the capsules are removed from the original point cloud. However, reviewing if each point is inside all the robot capsules may result in extensive computation and may not be the most optimal manner to proceed. Accordingly, depth image data may be used for robot removal. That is, instead of removing the robot directly from the point cloud in point-wise process, the disparity image produced by a stereo depth sensor may be exploited. The disparity image 200B shown in FIG. 2B uses a depth camera made by a robot scenario. Note that the extrinsic parameters from the camera are known for this and the capsule method. In addition, it is assumed that the intrinsic parameters of the camera are also known. Thus, the Camera Matrix may be obtained using the extrinsic and intrinsic parameters, which are further used to reproject the robot configuration into the image plane created by the camera, producing a projected shadow of the robot into the image plane or a mask. FIG. 2C illustrates a mask according to an example. Examples of the intrinsic parameters include focal length of the camera, focal point (camera center), pixel size, coverage area; examples of the extrinsic parameters include location of the focal point relative to a reference point (including, e.g., rotation and translation). Extrinsic parameters may be used when combining multiple sensors at different locations to provide a common reference frame.

Consequently, an AND operation is applied to the depth image with the mask 200C shown in FIG. 2C, resulting in a frame without the robot. Then, this image reprojects the points to a three-dimensional space to create the point cloud. FIG. 2C shows the resultant mask 200C from the robot superimposed with the original disparity image 200B. This exploits the parallelization of rendering in the GPU while other planning and control processes are computed.

Polytope Construction

After removing the robot from the scene and processing the remaining points in the point cloud, a voxelized (e.g., three-dimensional) representation of the occupied space near the robot may be obtained. The voxelized representation may be used for motion planning. A topological mapping approach may be used to identify a convex region around the joints of the robot. FIG. 3 illustrates construction of a HCP, free space region according to an example.

FIG. 3 illustrates three operations involved in the construction of the HCP 300. The identification of a query point in free space, corresponding to the center of the frame, is represented by the arrows shown in FIG. 3. The voxels in direct line of sight (LOS) to the query point are then identified, i.e., the ray from the query point to the wall of the voxel is in free space. These are the voxels highlighted in the far left image of FIG. 3. Note that these voxels can be selected at different layers of the octree hierarchy, depending on the user needs or input, e.g., to trade-off speed (fewer voxels to process) vs spatial resolution. Identification of the LOS voxels may take advantage of efficient octree collision detection implementations and may use safety strategies, such as voxel inflation.

In the center of FIG. 3, a convex hull is constructed from the center points of the LOS voxels. The convex hull includes convex polygons in three dimensional (3D) space and may include one or more of the LOS voxels in its interior. These interior voxels are highlighted.

Figure 4:
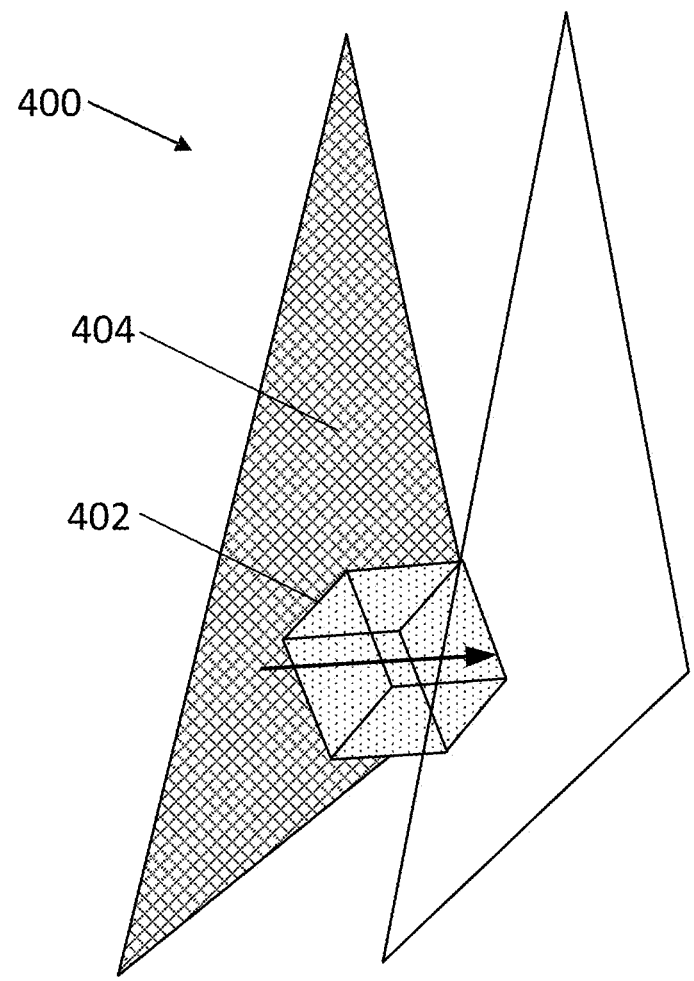
FIG. 4 illustrates modification of convex hull according to an example.

The HCP region is then formed as shown in the right side of FIG. 3 by modification of the convex hull to remove the interior voxels from the previous step. This is accomplished by identifying the nearest point on the convex hull to the center of each of the voxels and pushing the corresponding polygonal face in the direction of the point. FIG. 4 illustrates modification of convex hull according to an example. As shown in the modification 400 of the convex hull in FIG. 4 is to remove occupied voxels from the interior. The voxel 402 in the middle of FIG. 4 is initially inside the convex hull. The polygon contains the nearest point on the convex hull to the voxel 402. To make the interior of the convex hull free of obstacles, the polygonal face 404 is pushed in the direction of the voxel center point as illustrated by the arrow in FIG. 4.

Figure 6:
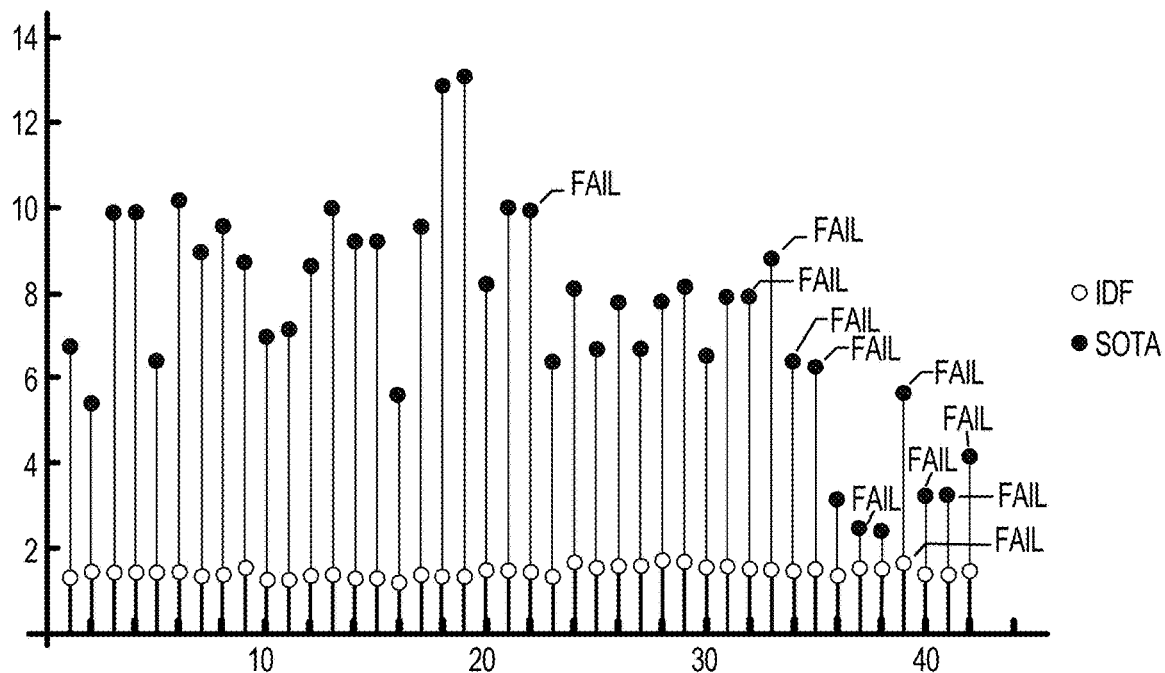
FIG. 6 illustrates computation time for the algorithm of FIG. 5 according to an example.
Figure 7:
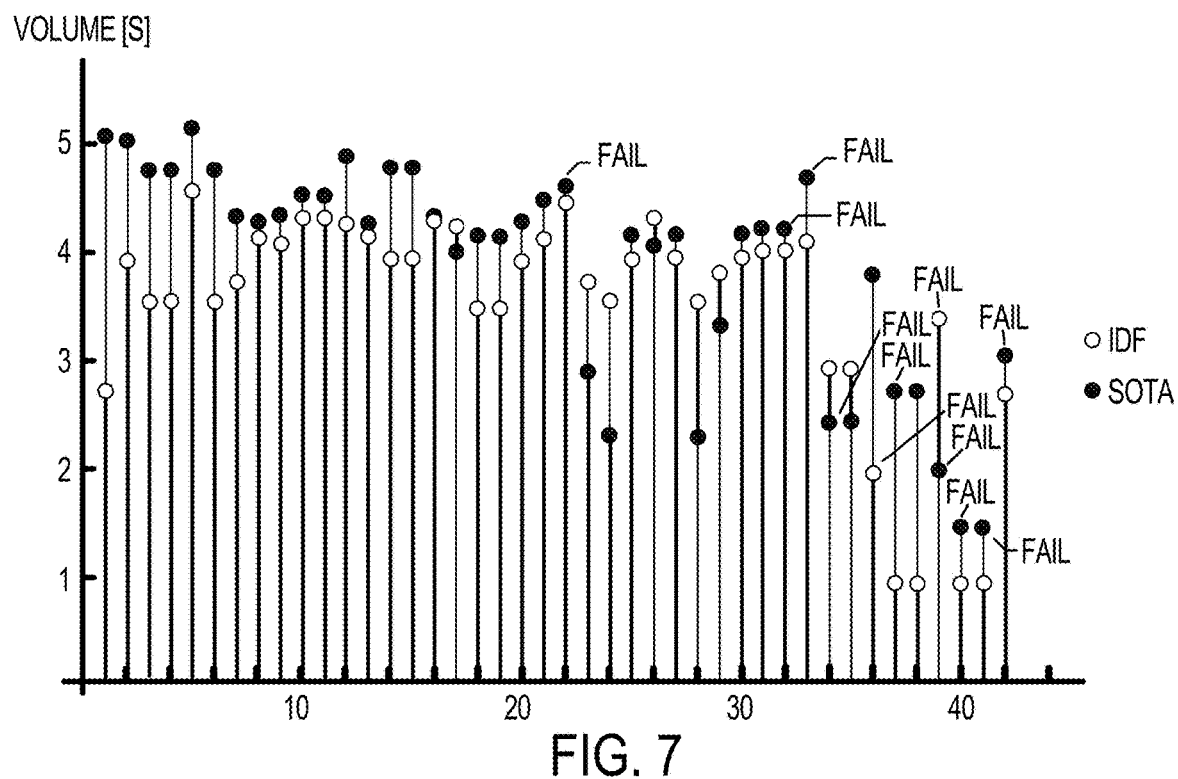
FIG. 7 illustrates convex region size for the algorithm of FIG. 5 according to an example.

FIG. 5 illustrates an HCP algorithm according to an example. The algorithm shown in FIG. 5 is used to construct the HCP. The algorithm was implemented in Mathematica as representative of the state of the art (SOTA). Results are shown in FIGS. 6 and 7. FIG. 6 illustrates computation time for the algorithm of FIG. 5 according to an example. FIG. 7 illustrates convex region size for the algorithm of FIG. 5 according to an example. FIG. 6 shows a comparison of computation time for the algorithm of FIG. 5 against the state of the art; FIG. 7 shows a comparison of the size of the generated convex region for the algorithm of FIG. 5 against the state of the art. The test cases were obtained by sampling the unoccupied space of the scene shown in FIG. 1 to select the query point.

As shown in FIG. 6, the algorithm of FIG. 5 is approximately six times faster than the state of the art, while generating only slightly smaller convex volumes (around 8%). The algorithm of FIG. 5 is also significantly more robust than the SOTA algorithm, which failed to generate valid convex regions in around 30% of the experiments. Most of the failures were due to exceeding the maximum allowed number of iterations in the SOTA algorithm. In a few failure cases the resulting polytope did not contain the query point. Note that the computation time of both algorithms is much slower than would be expected in a real implementation with production code. This is based on octree experience, where differences of >100× have been observed, and on the reported run times from the SOTA. In other words, the algorithm is suitable for real-time implementation in a robotics platform.

Motion Planning with HCP

Figure 8:
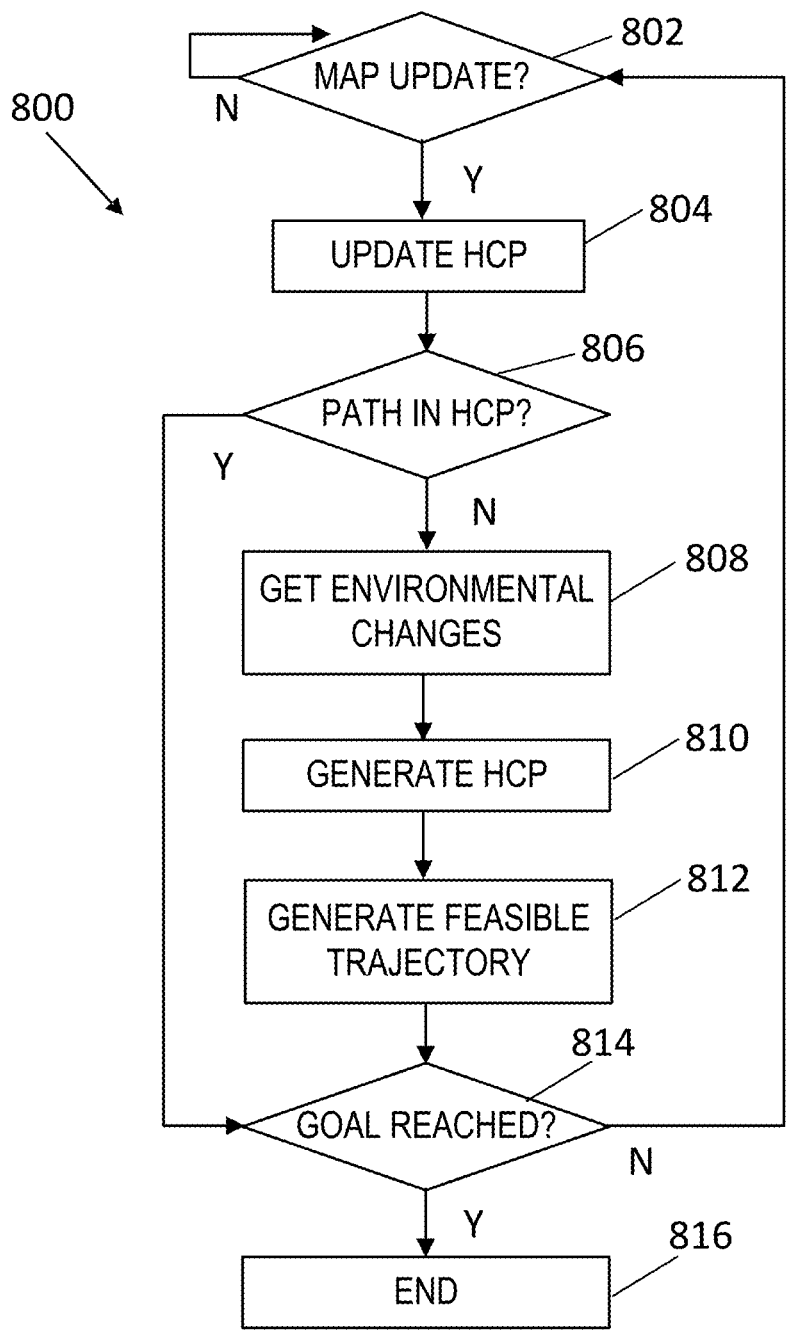
FIG. 8 illustrates a block diagram of a robot perception-action loop using the algorithm of FIG. 5 according to an example.

One use case of the HCP algorithm is in motion planning for a robot manipulator. FIG. 8 illustrates a block diagram of a robot perception-action loop using the algorithm of FIG. 5 according to an example. At operation 802 of the method 800, the method may wait until a map update is available. At operation 804, the free space region (HCP) is updated using the map update. The HCP corresponds to the convex polytope region constructed. The update involves identifying new occupied voxels inside the current HCP and shifting some of the faces of the polytope as described in more detail herein.

Whether a path is present in HCP is determined at operation 806. If not, environmental changes are obtained at operation 808, an HCP is generated (as described herein) at operation 810, and a feasible trajectory inside the HCP is generated at operation 812. The environmental changes are changes that may affect the execution of the current plan. For example, in the case of human-robot interaction, it is desirable to predict the intent of humans; and an efficient stochastic method for this is presented that takes advantage of the HCP to speed up the search of feasible motions. If a path is present, and after the trajectory is generated, whether a desired goal is reached may be determined at operation 814. If not, the method 800 returns to wait for a map update at operation 802; if so, the method 800 ends at operation 816. The new path may be generated at the frame rate (30 frames/second) of the camera/sensor.

The method 800 is amenable to both partial updates and reuse due to the scaffolding provided by the octree. That is, there is no need to recompute the HCP when there are no changes of the octree inside this region. This speeds up the computation as it is fast to check during map updates. In some cases, only the affected polygonal faces of the HCP may be modified when changes are localized.

Figure 9A:
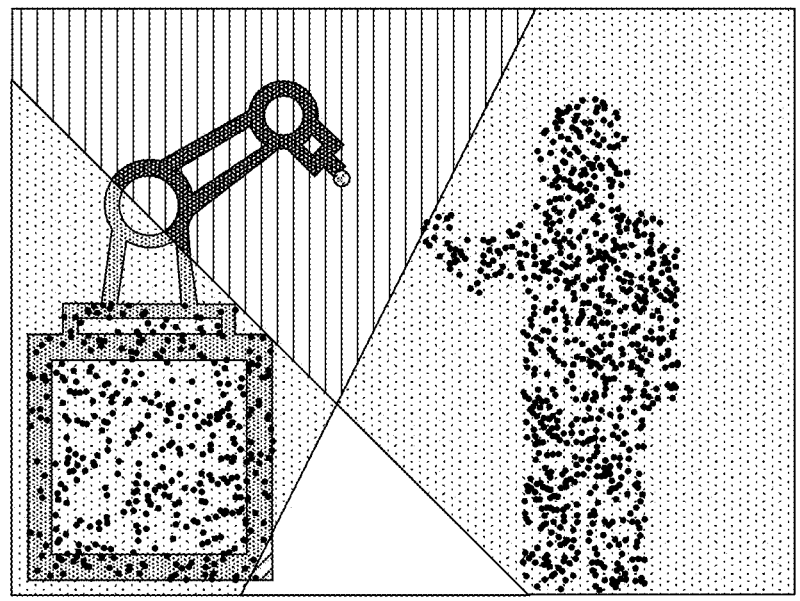
FIG. 9A illustrates a safe space of a robot formed by an intersection of half-planes according to an example.
Figure 9B:
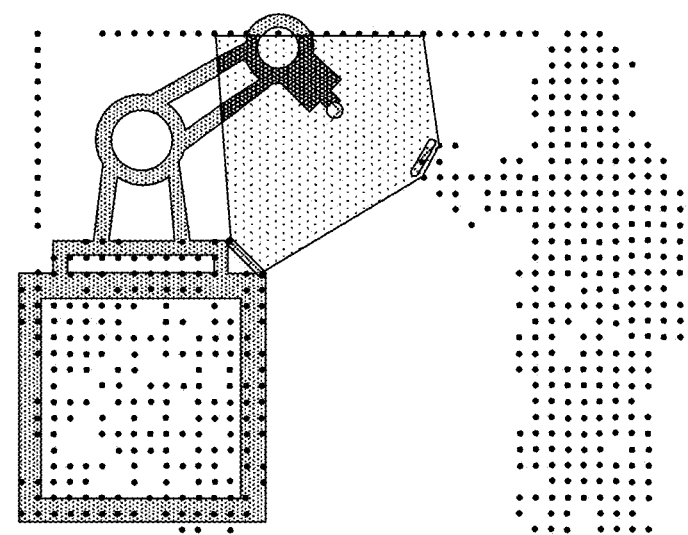
FIG. 9B illustrates a process to generate the half-planes of FIG. 9A according to an example.

FIG. 9A illustrates a safe space of a robot formed by an intersection of half-planes according to an example. For illustration purposes, some of the examples are presented in 2D, but the methods used work directly in 3D. FIG. 9B illustrates a process to generate the half-planes in the scene 900A of FIG. 9A according to an example. In FIG. 9B, the voxelized point cloud is used to construct a convex polytope containing the robot's end effector. The inactive planes of the polytope are then removed, leaving only the active planes shown in the scene 900B in FIG. 9B. The planes of the polytope region are set to be inactive when they are fully contained in free space, which can be checked efficiently using the octree representation.

Figure 10A:
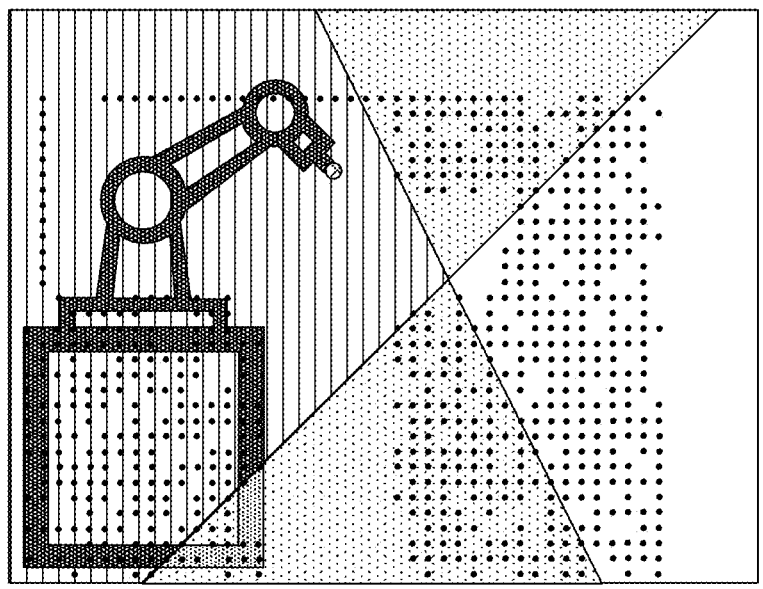
FIG. 10A illustrates motion planning using a convex polytope region according to an example.
Figure 10B:
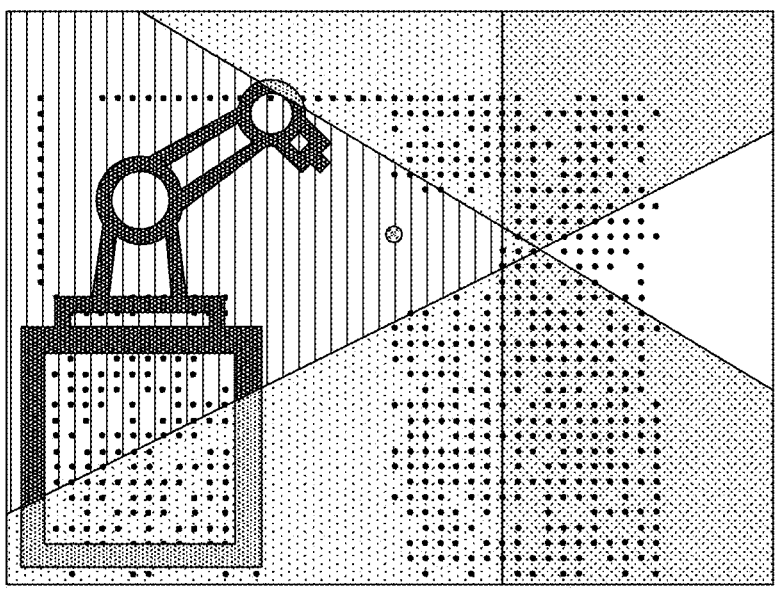
FIG. 10B illustrates intermediate waypoint creation in the convex polytope region of FIG. 10A according to an example.

FIG. 10A illustrates motion planning using a convex polytope region according to an example. FIG. 10B illustrates intermediate waypoint creation in the convex polytope region of FIG. 10A according to an example. FIGS. 10A and 10B illustrate the manner in which the method may be used for motion planning. First, a convex polytope region 1000A containing the current position of the end effector is constructed as shown in FIG. 10A. In the example shown, the robot is fully contained in the same convex region. Therefore, moving the robot's end effector to any point within this region may not result in collisions with external objects. If desired, additional convex polytopes can be constructed around other joints of the robot. Having removed the robot from the point cloud ensures that the locations of the end effector and the joints are in free space, which is used for constructing the polytopes.

Assuming that the final goal is in the free space outside the first convex polytope region, for example inside the concave region shown to the right of the robot in FIG. 10B, an intermediate waypoint is created inside the first polytope, close to the final goal. Then, a second free space polytope 1000B is constructed containing the intermediate waypoint and the final goal. To generate the trajectories from the current end effector position to the intermediate waypoint, and from this waypoint to the final goal, a probabilistic motion primitives' framework can be used, adding the active faces of the polytope as hyperplane constraints.

Safe Interactions through Intent Prediction

The spatial representation above may be reused by other algorithms that use an understanding of free space. More concretely, occupancy may be leveraged by intent prediction algorithms to estimate the probability that humans will move towards regions of the space that are close to (e.g., within a few meters of) the robot or that the robot intents moving to. Analysis by synthesis intent prediction algorithms make hypotheses about the human intent and evaluate the likelihood of the hypothesis by comparing the expected observations with the actual sensor data. Therefore, each hypothesis evaluation has its computational cost. By using the occupancy representation presented herein, intent prediction algorithms may be steered to sample only regions that are relevant for the use-case, greatly increasing their sampling efficiency and computational cost. This may enable the robot to preemptively adjust its velocity, trajectories, or motion plans to avoid interferences and improve the collaboration fluency in response to a determination that the human is likely (as set by a user, e.g., 5%, 10%, 20% or other probability) move into the path.

Humans only traverse through empty space. Thus, one straightforward usage of the obtained representation is to drive the human intent evaluation only in empty polytopes. Furthermore, evaluations may be further constrained to polytopes that are in-between the human and the robot. In addition, selection of sampling points along the normal direction of active planes is possible due to the oriented nature of the active planes. This way the sampling process is steered towards the most relevant regions and the intent prediction algorithm computes only the probability of the human traversing regions of the space that are important for the task at hand.

FIG. 11 illustrates polytope region use according to an example. FIG. 11 in particular shows visually the efficiency effect of the polytope regions 1100. In the left region, 16 samples at random over the empty space. Such a sample set is not dense enough to conclude what areas of the space are more likely to be traversed. In the middle, samples are restricted to polytopes between the human and the robot. Sample density and relevance is improved by evaluating locations in the space that are important for the task at hand. In the left, the same 16 samples are obtained from the active planes and displaced along their normal directions. This illustrates the impact of steering the sampling process to obtain meaningful predictions with just 16 samples. Moreover, the computational savings of this technique are exacerbated when applying them to the 3D case.

Collision Checking

A method for collision checking may be used that takes advantage of polytope creation. Recall that all the polytopes enclose free space. Also, all the voxels fully contained in polytopes are free. Thus, all the motion movements should be contained inside voxels in polytopes to ensure collision-free movement. In this case, the knowledge of voxels marked as contained inside a polytope and the liner octree structure may be combined. The two-point collision-free detection and then the application to robotics, particularly to manipulator robot motion planning are described. Subsequently, the usage of polytopes may be increased by classifying polytopes with higher or lower traversal costs to induce solutions that prefer or avoid those regions.

The first part is to decide if a line formed by a pair of points traverses only free space since most motion planning algorithms are based on this atomic function. The algorithm below depicts this. Specifically, the voxel at the maximum level that contains both ends of the line (easily computed using a hash function) is obtained. To obtain the voxel, the voxels are observed in the Liner Octree Structure (LOS); if the voxel is found, it is determined whether the voxel is marked as contained in a polytope, which would result in a collision-free line. If not, and the voxel that includes the entire line is a leaf, the voxel corresponds to an occupied one (outside of the polytopes). Otherwise, the children's voxels are computed and the voxels that are traversed by the line are retained. Then, with these voxels, the previous statement is reviewed. The algorithm ends when all traversed voxels are evaluated at the leaf level. Note that since the depth of the LOS is constant at executing time, the time of reviewing collision-free of lines maintains constant independently of the length of the line.

TABLE 1

LINE_COLLISION
INPUT: $p_{str}$, $p_{end}$, LOS={$v_0$, $v_1$, ..., $v_n$}
OUPUT: True / False
UpperKeysList ← HASH_FNC($p_{str}$, $p_{end}$)
WHILE SIZE(UpperKeysList):
  FOREACH UpperKey IN UpperKeysList:
    IF UpperKey.key == LEAF_LEVEL:
      RETURN POLYTOPE_MARKED(UpperKey.key)
    ELSE:
      ChildrenList ← CHILDREN(UpperKey, LOS)
      FOREACH child IN ChildrenList:
        $voxel_{center}$ ← INV_HASH_FNC(child)
        IF LINE_IN_VOXEL($p_{str}$, $p_{end}$, $voxel_{center}$)
          UpperKeysList.append(HASH_FNC($voxel_{center}$))
        ENDIF
      ENDFOREACH
    ENDIF
  ENDFOREACH
ENDWHILE
RETURN False The robot arm is subsequently represented as a set of lines with a radius of r. At each configuration of the manipulator, the lines representing all the links are generated and may be revised for collisions in cartesian space using the above. Since collision checking is the most compute-demanding operation in motion planning problems, this representation of space and collision checking algorithm allows fast motion plan computing, which turns into more reactive motions.

The mark of the voxels can be extended beyond free space. For example, a certain polytope can describe a volume that a human hardly transits. This knowledge is incorporated into the polytope as a type of prohibitive cost. Cost-based motion planning algorithms such as PRM*, RRT*, and A* can consider this cost, inducing trajectories that avoid such regions but not as hard rejection as they were occupied.

Figure 12A:
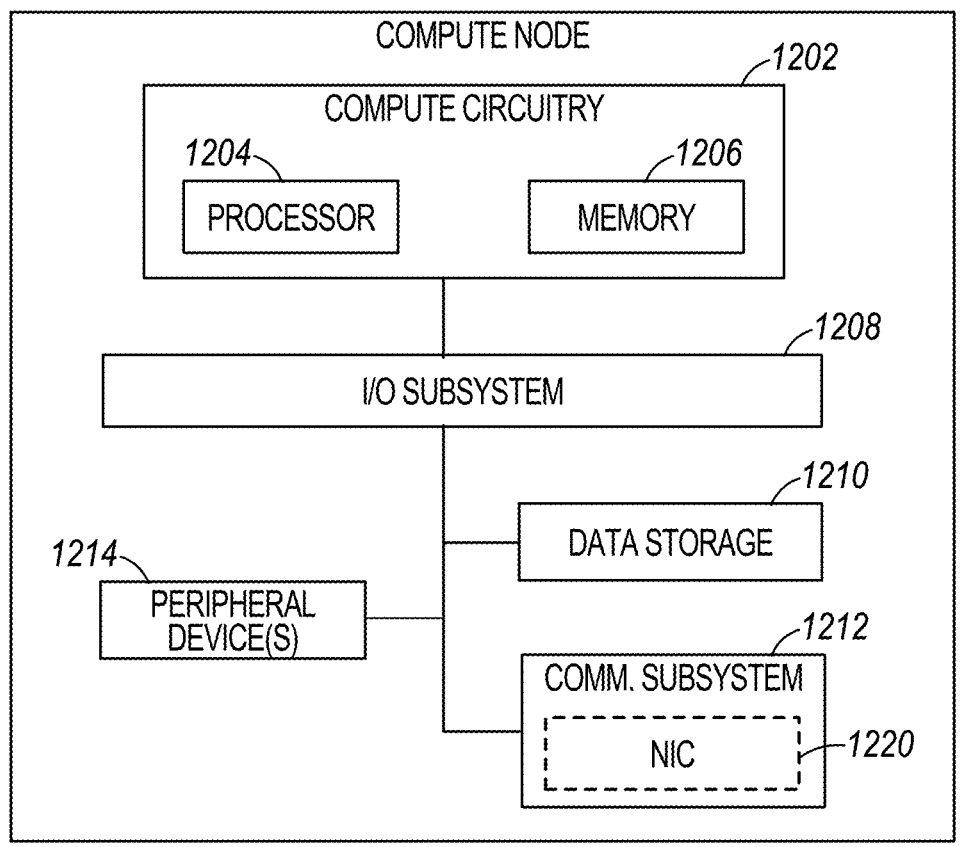
FIG. 12A provides an overview of example components.
Figure 12B:
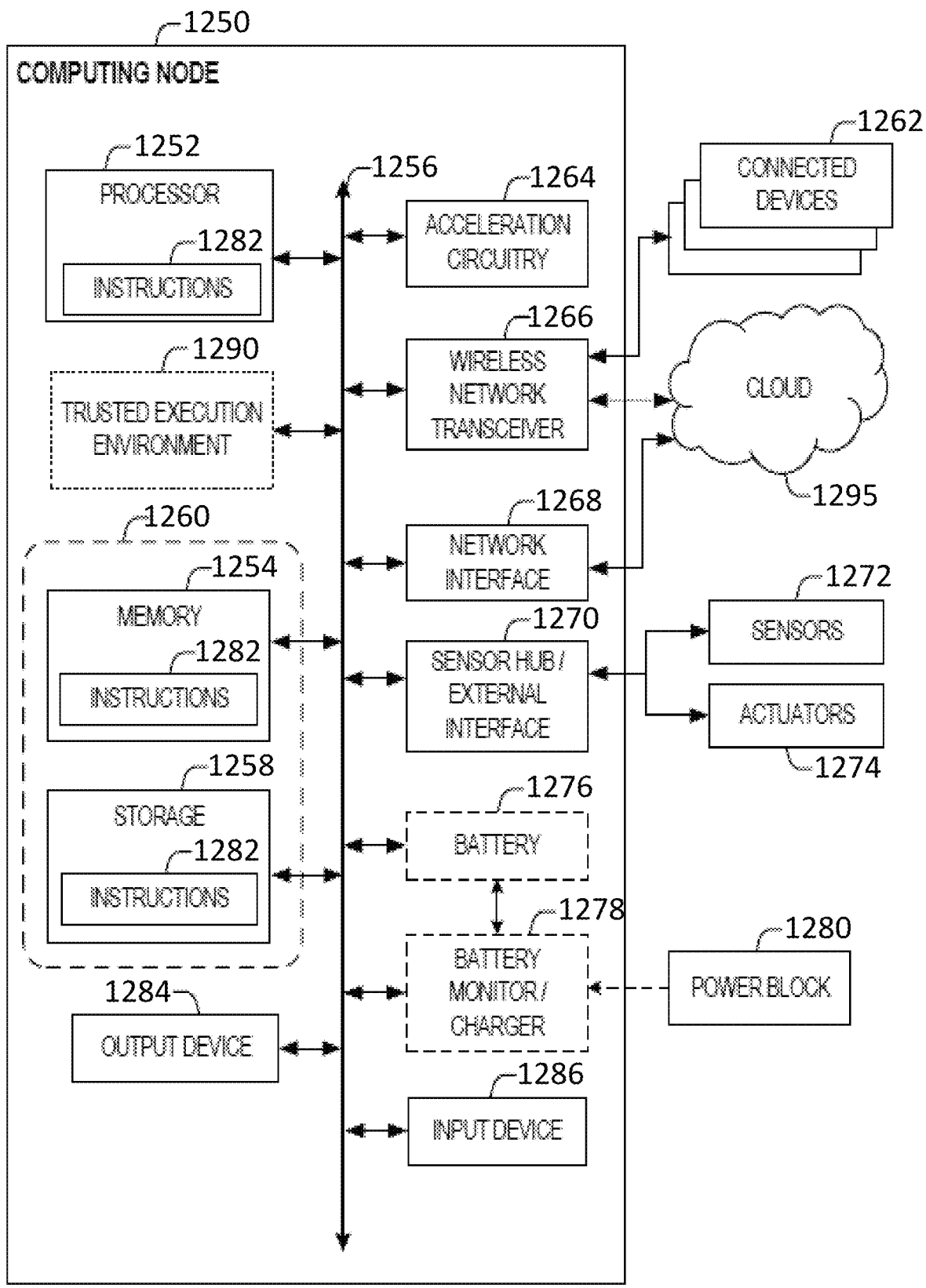
FIG. 12B provides a further overview of example components.

In further examples, any of the compute nodes or devices (e.g., robots) may be fulfilled based on the components depicted in FIGS. 12A and 12B. Respective compute nodes may be embodied as a type of device, appliance, computer, or other "thing" capable of communicating with other edge, networking, or endpoint components. For example, a compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 12A, a compute node 1200 includes a compute engine (also referred to herein as "compute circuitry") 1202, an input/output (I/O) subsystem 1208, data storage device 1210, a communication circuitry 1212, and, optionally, one or more peripheral devices 1214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1200 may be embodied as any type of engine, device, or collection of devices capable of performing various compute functions. In some examples, the compute node 1200 may be embodied as a single device such as an integrated circuit, an embedded system, a field-programmable gate array (FPGA), a system-on-a-chip (SOC), or other integrated system or device. In the illustrative example, the compute node 1200 includes or is embodied as a processor 1204 and a memory 1206. The processor 1204 may be embodied as any type of processor capable of performing the functions described herein (e.g., executing an application). For example, the processor 1204 may be embodied as a multi-core processor(s), a microcontroller, a processing unit, a specialized or special purpose processing unit, or other processor or processing/controlling circuit.

In some examples, the processor 1204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1204 may work in coordination with each other to execute many types of operations and instructions within and on behalf of the compute node 1200.

The memory 1206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1206 may be integrated into the processor 1204. The memory 1206 may store various software and data used during operation such as one or more applications, data operated on by the application(s), libraries, and drivers.

The compute circuitry 1202 is communicatively coupled to other components of the compute node 1200 via the I/O subsystem 1208, which may be embodied as circuitry and/or components to facilitate input/output operations with the compute circuitry 1202 (e.g., with the processor 1204 or the main memory 1206) and other components of the compute circuitry 1202. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1208 may form a portion of a system-on-a-chip (SoC) and be incorporated, along with one or more of the processor 1204, the memory 1206, and other components of the compute circuitry 1202, into the compute circuitry 1202.

The one or more illustrative data storage devices 1210 may be embodied as any type of devices configured for short-term or long-term storage of data such as, for example, memory devices and circuits, memory cards, hard disk drives, solid-state drives, or other data storage devices. Individual data storage devices 1210 may include a system partition that stores data and firmware code for the data storage device 1210. Individual data storage devices 1210 may also include one or more operating system partitions that store data files and executables for operating systems depending on, for example, the type of compute node 1200.

The communication circuitry 1212 may be embodied as any communication circuit, device, or collection thereof, capable of enabling communications over a network between the compute circuitry 1202 and another compute device (e.g., a gateway of an implementing computing system). The communication circuitry 1212 may be configured to use any one or more communication technology (e.g., wired or wireless communications) and associated protocols (e.g., a cellular networking protocol such a 3GPP 4G or 8G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1212 includes a network interface controller (NIC) 1220, which may also be referred to as a host fabric interface (HFI). The NIC 1220 may be embodied as one or more add-in-boards, daughter cards, network interface cards, controller chips, chipsets, or other devices that may be used by the compute node 1200 to connect with another compute device (e.g., a gateway node). In some examples, the NIC 1220 may be embodied as part of a system-on-a-chip (SoC) that includes one or more processors, or included on a multichip package that also contains one or more processors. In some examples, the NIC 1220 may include a local processor (not shown) and/or a local memory (not shown) that are both local to the NIC 1220. In such examples, the local processor of the NIC 1220 may be capable of performing one or more of the functions of the compute circuitry 1202 described herein. Additionally, or alternatively, in such examples, the local memory of the NIC 1220 may be integrated into one or more components of the client compute node at the board level, socket level, chip level, or other levels.

Additionally, in some examples, a respective compute node 1200 may include one or more peripheral devices 1214. Such peripheral devices 1214 may include any type of peripheral device found in a compute device or server such as audio input devices, a display, other input/output devices, interface devices, and/or other peripheral devices, depending on the particular type of the compute node 1200. In further examples, the compute node 1200 may be embodied by a respective compute node (whether a client, gateway, or aggregation node) in a computing system or like forms of appliances, computers, subsystems, circuitry, or other components.

In a more detailed example, FIG. 12B illustrates a block diagram of an example of components that may be present in a computing node 1250 for implementing the techniques (e.g., operations, processes, methods, and methodologies) described herein. This computing node 1250 provides a closer view of the respective components of node 1200 when implemented as or as part of a computing device (e.g., as a mobile device, a base station, server, gateway, etc.). The computing node 1250 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1250, or as components otherwise incorporated within a chassis of a larger system.

The computing node 1250 may include processing circuitry in the form of a processor 1252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1252 may be a part of a system on a chip (SoC) in which the processor 1252 and other components are formed into a single integrated circuit, or a single package, such as the Edison™ or Galileo™ SoC boards from Intel Corporation, Santa Clara, California. As an example, the processor 1252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1252 and accompanying circuitry may be provided in a single socket form factor, multiple socket form factor, or a variety of other formats, including in limited hardware configurations or configurations that include fewer than all elements shown in FIG. 12B.

The processor 1252 may communicate with a system memory 1254 over an interconnect 1256 (e.g., a bus). Any number of memory devices may be used to provide for a given amount of system memory. As examples, the memory 1254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example, the storage 1258 may be implemented via a solid-state disk drive (SSDD). Other devices that may be used for the storage 1258 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1256 may couple the processor 1252 to a transceiver 1266, for communications with the connected devices 1262. The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1266 (or multiple transceivers) may communicate using multiple standards or radios for communications at a different range. For example, the computing node 1250 may communicate with close devices, e.g., within about 10 meters, using a local transceiver based on Bluetooth Low Energy (BLE), or another low power radio, to save power. More distant connected devices 1262, e.g., within about 70 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in the cloud 1295 via local or wide area network protocols. The wireless network transceiver 1266 may be a low-power wide-area (LPWA) transceiver that follows the IEEE 802.15.4, or IEEE 802.15.4g standards, among others. The computing node 1250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1266 may include radios that are compatible with any number of 3GPP (Third Generation Partnership Project) specifications, such as Long Term Evolution (LTE) and 12th Generation (5G) communication systems, discussed in further detail at the end of the present disclosure. A network interface controller (NIC) 1268 may be included to provide a wired communication to nodes of the cloud 1295 or to other devices, such as the connected devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components shown herein. Accordingly, in various examples, applicable means for communicating (e.g., receiving, transmitting, etc.) may be embodied by such communications circuitry.

The computing node 1250 may include or be coupled to acceleration circuitry 1264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1256 may couple the processor 1252 to a sensor hub or external interface 1270 that is used to connect additional devices or subsystems. The devices may include sensors 1272, such as accelerometers, level sensors, flow sensors, optical light sensors, camera sensors, temperature sensors, global navigation system (e.g., GPS) sensors, pressure sensors, barometric pressure sensors, and the like. The hub or interface 1270 further may be used to connect the computing node 1250 to actuators 1274, such as power switches, valve actuators, an audible sound generator, a visual warning device, and the like.

In some optional examples, various input/output (I/O) devices may be present within or connected to, the computing node 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1250. A display or console hardware, in the context of the present system, may be used to provide output and receive input of a computing system; to manage components or services of a computing system; identify a state of a computing component or service; or to conduct any other number of management or administration functions or service use cases.

A battery 1276 may power the computing node 1250, although, in examples in which the computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1278 may communicate the information on the battery 1276 to the processor 1252 over the interconnect 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine-readable medium 1260 including code to direct the processor 1252 to perform electronic operations in the computing node 1250. The processor 1252 may access the non-transitory, machine-readable medium 1260 over the interconnect 1256. For instance, the non-transitory, machine-readable medium 1260 may be embodied by devices described for the storage 1258 or may include specific storage units such as optical disks, flash drives, or any number of other hardware devices. The non-transitory, machine-readable medium 1260 may include instructions to direct the processor 1252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1282 on the processor 1252 (separately, or in combination with the instructions 1282 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the computing node 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own or may be combined in various permutations or combinations with one or more of the other examples.

Thus, in some embodiments, a point cloud may be created using sensors (separate from or on the robot) in which the points represent occupied space and other portions of the area represent free space for the robot to move. In some embodiments, a convex region of free space may be created using the point cloud, allowing the robot to move freely within the convex region without risk of collision along the path traveled by the robot.

In some embodiments, the point cloud is segmented using a discretized representation such as an octree that uses voxels. The octree may be obtained using the sensor measurements. A convex region of free space may be created using the voxels, allowing the robot to move freely within the convex region without risk of collision along the path traveled by the robot.

EXAMPLES

Example 1 is a system comprising: processing circuitry; and memory including instructions, which when executed by the processing circuitry cause the processing circuitry to: obtain a voxelized representation of occupied space in a scene the voxelized representation including a point cloud; form a Hierarchical Convex Polytope (HCP) region of unoccupied space around a point of interest in the scene using topological mapping; determine a path of a robot from the point of interest within the HCP region to an end point.

In Example 2, the subject matter of Example 1 includes, wherein the instructions further cause the processing circuitry to remove the robot from an original point cloud prior to formation of the HCP region to form the point cloud.

In Example 3, the subject matter of Example 2 includes, wherein the instructions further cause the processing circuitry to remove the robot from the original point cloud based on image depth data from at least one sensor.

In Example 4, the subject matter of Example 3 includes, wherein to remove the robot from the point cloud, the instructions further cause the processing circuitry to: use the image depth data to create a mask that includes a projection of the robot on a depth image created by the at least one sensor; and logically combine the mask with the depth image to remove the robot from the depth image to form the point cloud.

In Example 5, the subject matter of Examples 1-4 includes, wherein: the voxelized representation comprises a linear octree containing layers, each layer containing voxels of a different size, and the instructions further cause the processing circuitry to select among the layers to determine the voxels in a direct line of sight (LOS) based on user input.

In Example 6, the subject matter of Examples 1-5 includes, wherein the HCP region contains a convex hull that includes convex polygons in three dimensional (3D) space.

In Example 7, the subject matter of Examples 1-6 includes, wherein to form the HCP region, the instructions further cause the processing circuitry to: determine voxels of the voxelized representation of occupied space in a direct line of sight (LOS) from the point of interest; construct a convex hull from center points of the voxels, the convex hull formed from convex polygons in three dimensional space; identify whether interior voxels are present in an interior of the convex hull; and in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel until the interior voxel is no longer bounded by the convex hull.

In Example 8, the subject matter of Examples 1-7 includes, wherein the instructions further cause the processing circuitry to: receive new sensor data from at least one sensor; based on the new sensor data, identify new occupied voxels within the HCP; update the HCP based on identification of the new occupied voxels within the HCP to form an updated HCP in which the new occupied voxels are no longer within the updated HCP; determine whether the path remains entirely within the updated HCP; and in response to a determination that a portion of the path lies outside the updated HCP, generate a new path to the end point.

In Example 9, the subject matter of Example 8 includes, wherein the instructions further cause the processing circuitry to identify the new occupied voxels within the HCP based on human presence within the HCP.

In Example 10, the subject matter of Examples 8-9 includes, wherein to generate the new path, the instructions further cause the processing circuitry to: obtain revised sensor data; generate a revised HCP based on the revised sensor data; and generate the new path based on the revised HCP.

In Example 11, the subject matter of Example 10 includes, wherein to generate the new path, the instructions further cause the processing circuitry to: determine whether the end point is within the revised HCP; in response to a determination that the end point does not lie within the revised HCP, determine a partial path to an intermediate point closer to the end point than the point of interest; generate at least one other HCP that contains the end point; and for each other HCP, generate another partial path within the other HCP until the new path is generated, the new path being a combination of the partial path and the other partial path for each other HCP.

In Example 12, the subject matter of Examples 1-11 includes, wherein the instructions further cause the processing circuitry to: determine, based on sensor data from at least one sensor, that a human is proximate to the unoccupied space; constrain a plurality of hypotheses that the human intends to move into the path to polytopes in between the human and the robot; based on the sensor data, evaluate a likelihood of each hypothesis; and adjust at least one of velocity, trajectory, or motion plan associated with the path in response to a determination that the human is likely move into the path.

In Example 13, the subject matter of Examples 1-12 includes, wherein to determine the path, the instructions further cause the processing circuitry to: determine whether a voxel contains both ends of a line is in a Liner Octree Structure (LOS); in response to a determination that the voxel is in the LOS, determine whether the voxel is marked as contained in a polytope; and in response to a determination that the voxel is not marked as contained in a polytope, determine whether the voxel is a leaf; and in response to a determination that the voxel is a leaf, determine that the voxel corresponds to an occupied voxel; and in response to a determination that the voxel is not a leaf, compute child voxels of the voxels, retain the child voxels that are traversed by the line, and, for each child voxel, repeat for each generation of voxel the determination of whether the generation of voxel is marked as contained in a polytope and is a leaf until all traversed voxels traversed by the line are evaluated at a leaf level.

In Example 14, the subject matter of Example 13 includes, wherein the instructions further cause the processing circuitry to: represent an arm of the robot as a set of lines with a radius of r; and at each configuration of a manipulator on the arm, generate lines representing links of the robot and revise the lines for collisions during construction of a path of the arm.

Example 15 is a robot comprising: processing circuitry configured to: obtain a voxelized representation of a scene; form a Hierarchical Convex Polytope (HCP) region of unoccupied space around a point of interest in the scene; determine a path of at least an arm of the robot at the point of interest to an end point within the HCP region; and an actuator to move at least the arm of the robot based on the path.

In Example 16, the subject matter of Example 15 includes, wherein to form the HCP region, the processing circuitry is further configured to: determine voxels of occupied space in a direct line of sight (LOS) from the point of interest; construct a convex hull from center points of the voxels, the convex hull formed from convex polygons in three dimensional space; identify whether interior voxels are present in an interior of the convex hull; and in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel until the interior voxel is no longer bounded by the convex hull.

In Example 17, the subject matter of Examples 15-16 includes, wherein the processing circuitry is further configured to: remove the robot from an original point cloud prior to formation of the HCP region to form a point cloud based on image depth data from at least one sensor by using the image depth data to create a mask that includes a projection of the robot on a depth image created by the at least one sensor and logically combining the mask with the depth image to remove the robot from the depth image to form the point cloud.

Example 18 is at least one machine-readable medium including instructions, which when executed by processing circuitry of a robot, cause the processing circuitry to perform operations to: obtain a voxelized representation of a scene, the voxelized representation comprising multiple generations of voxels; form a Hierarchical Convex Polytope (HCP) region of unoccupied space around a point of interest in the scene; determine a path of at least a portion of the robot at the point of interest to an end point within the HCP region along at least one of the generations of voxels; and move at least the portion of the robot based on the path.

In Example 19, the subject matter of Example 18 includes, wherein to form the HCP region the instructions further cause the processing circuitry to: determine voxels of occupied space in a direct line of sight (LOS) from the point of interest; construct a convex hull from center points of the voxels, the convex hull formed from convex polygons in three dimensional space; identify whether interior voxels are present in an interior of the convex hull; and in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel.

In Example 20, the subject matter of Examples 18-19 includes, wherein the instructions further cause the processing circuitry to remove the robot from an original point cloud prior to formation of the HCP region based on: creation of a mask using image depth data from at least one sensor, the mask including a projection of the robot on a depth image, and a logical combination of the mask with the depth image to remove the robot and form a point cloud.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Such aspects of the subject matter may be referred to herein, individually and/or collectively, merely for convenience and without intending to voluntarily limit the scope of this application to any single aspect if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
   processing circuitry; and
   memory including instructions, which when executed by the processing circuitry cause the processing circuitry to:
      obtain a voxelized representation of occupied space in a scene, the voxelized representation including a point cloud;
      form a Hierarchical Convex Polytope (HCP) region of unoccupied space around a point of interest in the scene using topological mapping; and
      determine a path of a robot from the point of interest within the HCP region to an end point.

2. The system of claim 1, wherein the instructions further cause the processing circuitry to remove data points corresponding to the robot from an original point cloud prior to formation of the HCP region to form the point cloud.

3. The system of claim 2, wherein the instructions further cause the processing circuitry to remove the robot from the original point cloud based on image depth data from at least one sensor.

4. The system of claim 3, wherein to remove the robot from the point cloud, the instructions further cause the processing circuitry to:
   use the image depth data to create a mask that includes a projection of the robot on a depth image created by the at least one sensor; and
   logically combine the mask with the depth image to remove the robot from the depth image to form the point cloud.

5. The system of claim 1, wherein:
   the voxelized representation comprises a linear octree containing layers, each layer containing voxels of a different size, and
   the instructions further cause the processing circuitry to select among the layers to determine the voxels in a direct line of sight (LOS) based on user input.

6. The system of claim 1, wherein the HCP region contains a convex hull that includes convex polygons in three dimensional (3D) space.

7. The system of claim 1, wherein to form the HCP region, the instructions further cause the processing circuitry to:
   determine voxels of the voxelized representation of occupied space in a direct line of sight (LOS) from the point of interest;
   construct a convex hull from center points of the voxels, the convex hull formed from convex polygons in three dimensional space;
   identify whether interior voxels are present in an interior of the convex hull; and
   in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel until the interior voxel is no longer bounded by the convex hull.

8. The system of claim 1, wherein the instructions further cause the processing circuitry to:
   receive new sensor data from at least one sensor;
   based on the new sensor data, identify new occupied voxels within the HCP;
   update the HCP based on identification of the new occupied voxels within the HCP to form an updated HCP in which the new occupied voxels are no longer within the updated HCP;
   determine whether the path remains entirely within the updated HCP; and
   in response to a determination that a portion of the path lies outside the updated HCP, generate a new path to the end point.

9. The system of claim 8, wherein the instructions further cause the processing circuitry to identify the new occupied voxels within the HCP based on human presence within the HCP.

10. The system of claim 8, wherein to generate the new path, the instructions further cause the processing circuitry to:
    obtain revised sensor data;
    generate a revised HCP based on the revised sensor data; and
    generate the new path based on the revised HCP.

11. The system of claim 10, wherein to generate the new path, the instructions further cause the processing circuitry to:

determine whether the end point is within the revised HCP;

in response to a determination that the end point does not lie within the revised HCP, determine a partial path to an intermediate point closer to the end point than the point of interest;

generate at least one other HCP that contains the end point; and for each other HCP, generate another partial path within the other HCP until the new path is generated, the new path being a combination of the partial path and the other partial path for each other HCP.

12. The system of claim 1, wherein the instructions further cause the processing circuitry to:

determine, based on sensor data from at least one sensor, that a human is proximate to the unoccupied space;

constrain a plurality of hypotheses that the human intends to move into the path to polytopes in between the human and the robot;

based on the sensor data, evaluate a likelihood of each hypothesis; and adjust at least one of velocity, trajectory, or motion plan associated with the path in response to a determination that the human is likely move into the path.

13. The system of claim 1, wherein to determine the path, the instructions further cause the processing circuitry to:

determine whether a voxel that contains both ends of a line is in a Liner Octree Structure;

in response to a determination that the voxel is in the LOS Liner Octree Structure, determine whether the voxel is marked as contained in a polytope;

in response to a determination that the voxel is not marked as contained in a polytope, determine whether the voxel is a leaf;

in response to a determination that the voxel is a leaf, determine that the voxel corresponds to an occupied voxel; and in response to a determination that the voxel is not a leaf, compute child voxels of the voxels, retain the child voxels that are traversed by the line, and, for each child voxel, repeat for each generation of voxel the determination of whether the generation of voxel is marked as contained in a polytope and is a leaf until all traversed voxels traversed by the line are evaluated at a leaf level.

14. The system of claim 13, wherein the instructions further cause the processing circuitry to:

represent an arm of the robot as a set of lines with a radius of r; and at each configuration of a manipulator on the arm, generate lines representing links of the robot and revise the lines for collisions during construction of a path of the arm.

15. A robot comprising:

processing circuitry configured to:

obtain a voxelized representation of a scene;

form a Hierarchical Convex Polytope (HCP) region of unoccupied space around a point of interest in the scene; and determine a path of at least an arm of the robot at the point of interest to an end point within the HCP region; and an actuator to move at least the arm of the robot based on the path.

16. The robot of claim 15, wherein to form the HCP region, the processing circuitry is further configured to:

determine voxels of occupied space in a direct line of sight (LOS) from the point of interest;

construct a convex hull from center points of the voxels, the convex hull formed from convex polygons in three dimensional space;

identify whether interior voxels are present in an interior of the convex hull; and in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel until the interior voxel is no longer bounded by the convex hull.

17. The robot of claim 15, wherein the processing circuitry is further configured to: remove the robot from an original point cloud prior to formation of the HCP region to form a point cloud based on image depth data from at least one sensor by using the image depth data to create a mask that includes a projection of the robot on a depth image created by the at least one sensor and logically combining the mask with the depth image to remove the robot from the depth image to form the point cloud.

18. At least one machine-readable medium including instructions, which when executed by processing circuitry of a robot, cause the processing circuitry to perform operations to:

obtain a voxelized representation of a scene, the voxelized representation comprising multiple generations of voxels;

form a Hierarchical Convex Polytope (HCP) region of unoccupied space around a point of interest in the scene;

determine a path of at least a portion of the robot at the point of interest to an end point within the HCP region along at least one of the generations of voxels; and move at least the portion of the robot based on the path.

19. The at least one machine-readable medium of claim 18, wherein to form the HCP region the instructions further cause the processing circuitry to:

determine voxels of occupied space in a direct line of sight (LOS) from the point of interest;

construct a convex hull from center points of the voxels, the convex hull formed from convex polygons in three dimensional space;

identify whether interior voxels are present in an interior of the convex hull; and in response to a determination that interior voxels are present in the interior of the convex hull, form the HCP region by modification of the convex hull to remove the interior voxels, the modification including, for each interior voxel, identification of a nearest point on the convex hull to a center of the interior voxel and moving a polygonal face corresponding to the nearest point in a direction of the center of the interior voxel.

20. The at least one machine-readable medium of claim 18, wherein the instructions further cause the processing circuitry to remove the robot from an original point cloud prior to formation of the HCP region based on:

creation of a mask using image depth data from at least one sensor, the mask including a projection of the robot on a depth image, and a logical combination of the mask with the depth image to remove the robot and form a point cloud.

* * * * *